United States Patent Office 3,825,649
Patented July 23, 1974

3,825,649
PROCESS FOR SEPARATION OF PROTACTINIUM, THORIUM AND URANIUM FROM NEUTRON-IRRADIATED THORIUM
Alan T. Gresky, Jouko E. Savolainen, and William T. McDuffee, Jr., Oak Ridge, and Russell P. Wischow, Nashville, Tenn., assignors to the United States of America as represented by the United States Atomic Energy Commission
Filed Aug. 7, 1956, Ser. No. 602,686
Int. Cl. C01g 56/00; C22b 61/04
U.S. Cl. 423—4
21 Claims

ABSTRACT OF THE DISCLOSURE

Protactinium, uranium and thorium are separated from an aqueous nitric acid solution of neutron-irradiated thorium containing these elements and fission products by contacting, under net nitrate deficient conditions, the acid solution with an organic solution of a trialkyl phosphate in an inert organic diluent, thereby preferentially extracting uranium and thorium into the organic phase while confining protactinium and fission products to the aqueous phase. After scrubbing the organic phase with a aqueous solution of an inorganic nitrate salt to remove small amounts of protactinium and fission products, the two phases are separated and thorium and uranium are separately recovered from the organic phase.

Our invention relates to a process for the decontamination of neutron-irradiated thorium, and more particularly to a process for the separation of protactinium-233, thorium and uranium-323 from neutron-irradiated thorium.

A major factor in the cost of generating electricity from nuclear fission is the cost of the fuel. Factors which contribute to low fuel cost and towards which reactor designs seek to approach are low cost fabrication of fuel elements, high burn-up of fuel before reprocessing is required, low cost reprocessing, and high thermal efficiency. A concurrent approach in reducing the unit cost of generating electricity from nuclear fission is to obtain byproducts of high value which can be credited against other generation costs. A principal effort in this direction is towards the regeneration of fissionable material from "fertile" materials concurrent with the consumption of nuclear fuel. Reactors designed for fuel regeneration as well as power production are commonly known as "dual-purpose" or "breeder" reactors and the regenerative fissionable materials produced by such reactors are the well-known plutonium (from uranium-238) and also uranium-233 (from thorium). Depending upon the neutron economy of a particular reactor (the number of neutrons available for radiative capture by a fertile material beyond the requirements of maintaining the chain reaction) as much or more fissionable material may be produced as is consumed. Such a breeding program may make reactor-produced power competitive with conventional power, and, of at least equal importance, the limited supply of precious fissionable material will be conserved. In fact, since the world supply of thorium is greater than the world supply of uranium, the potential exists for actually increasing the amount of fissionable material by conversion of thorium to fissionable uranium-233, which, upon recovery, may be used to convert additional thorium to uranium.

Uranium-233 is obtained by the neutron bombardment of naturally occurring thorium-232, essentially by the following principal nuclear reactions:

Thorium may be subjected to neutron bombardment in varying types of reactors. For example, thorium metal may be inserted as aluminum-encased slugs into a heterogeneous reactor, or slurries of thorium oxide may be circulated about a homogeneous reactor core of an aqueous uranyl sulfate solution enriched, beyond natural abundance, with regard to uranium-235.

The chemical processing of neutron bombarded thorium is of prime importance, for any product material lost in the chemical processing, in effect, increases the demands upon the efficiency of the reactor system. Furthermore, in reactor fuel processing, contrary to most chemical processing operations, relatively great amounts of unreacted material must be separated from relatively small amounts of products. This arises from the fact that nuclear fission products of high neutron-absorption cross sections compete with the fuel for fission-released neutrons. Unless such fission products are removed from the reactor, the maintenance of the chain reaction itself may be threatened. Thus, in actual practice, the fuel and fertile material must be periodically removed from the reactor for decontamination long before the fuel and fertile material are consumed. In addition to extremely high recovery of fissionable uranium-233, ideally approaching 100%, the chemical processing should also achieve excellent decontamination of uranium-233 and thorium from highly radioactive fission products before preparation for reuse in reactors. This is essential for both personnel safety and maintenance of good neutron economy.

Perhaps the most perplexing of all problems associated with the chemical processing of neutron-irradiated thorium is the handling of the highly radioactive protactinium-233, the parent of uranium-233. This isotope usually accounts for greater than 95% of the beta-gamma activity in the irradiated thorium at the time of withdrawal from the reactor. The relatively short half-life of protactinium (27.4 days) would argue for prolonged cooling of the irradiated thorium prior to any chemical processing to minimize losses of potential uranium-233. It is estimated that a cooling period of about 250 days would normally permit uranium-233 losses of less than 0.1% and would allow decay of the 24.1-day thorium-234 activities which otherwise limit thorium-product purification. Furthermore, the extreme radioactivity of protactinium, with its consequent shielding and handling problems, presents additional argument for longer cooling before chemical processing. Overcoming all these arguments in favor of longer cooling period, nonetheless, is the single, crucial fact of the high inventory charges against fissionable materials. Thus, the precious and expensive fissionable uranium-233 and the fertile thorium cannot be permitted to remain dormant and unproductive. Furthermore, and apart from a uranium-233 breeder program, protactinium itself is required for basic academic studies, as a tracer and as a concentrated beta-gamma source for a host of radiation purposes. Therefore, the chemical process for recovering uranium-233 must be prepared to deal with relatively short-cooled feed material, e.g. 40 days and even less, as well as possess flexibility for treating longer-aged material.

The separation of protactinium, thorium and uranium presents problems of unprecedented severity. For example, thorium, protactinium, and uranium are immediately adjacent neighbors in the actinide rare earth series of the Periodic Chart of the Elements. Although recognizable differences are present among the rare earths, they are notoriously chemically similar, since they differ only in the number of electrons in their deep, underlying shells, rather than in their valence electrons which normally govern chemical reactions. Furthermore, there is scanty and unreliable information available concerning the basic chemistry of protactinium. Ideally, a protactinium recovery process should provide for its separation relatively early to permit the subsequent chemical separation and decontamination of thorium and uranium-233 to be conducted under less shielding and with reduced radiation hazards.

There are presently available continuous solvent extraction processes for accomplishing the two-way separation of plutonium and uranium from neutron-irradiated uranium. A representative process of this nature is described in Ser. No. 303,691, filed Aug. 11, 1952 in the names of T. C. Runion, W. B. Lanham, Jr. and C. V. Ellison for "Process for Separation of Plutonium, Uranium and Fission Product Values." In brief, this process consists of the extraction of uranium and plutonium from an aqueous solution with an organic solvent while confining the fission products to the aqueous solution, followed by preferential stripping of the plutonium and then of the uranium from the organic extract with aqueous solutions. The extraction of plutonium into the organic solvent is critically dependent upon its maintenance in the tetravalent state, while the subsequent stripping of plutonium relies upon its reduction to the trivalent state.

Until now, however, there has not been available a satisfactory solvent extraction process for the separation of protactinium from neutron-irradiated thorium. Nor has there been available a solvent extraction process for the immensely difficult three-way separation of protactinium, thorium and uranium from each other and fission products.

An object of our invention, consequently, is to provide a process for the separation of protactinium, uranium and thorium from neutron-irradiated thorium.

Another object is to provide a process adapted for such a separation from an aqueous solution of neutron-irradiated thorium in high yield.

Another object is to provide a liquid-liquid solvent extraction process for such separation.

Still another object is to provide a continuous solvent extraction process for the individual separation of protactinium, thorium and uranium from fission products from an aqueous solution of neutron-irradiated thorium.

Again another object is to provide such a process wherein a single extraction with a single extractant followed by a pair of simple stripping operations achieves distinct and complete separation of the three components.

A further object is to provide such a process wherein the protactinium is the first of the three components separated.

A still further object is to provide such a process sufficiently versatile to handle neutron-irradiated thorium of varying ages.

Yet a further object is to provide a process appropriate for large scale operation in a continuous manner.

These and additional objects and advantages of our invention will become apparent to those skilled in the art from the following detailed description and the claims appended hereto.

In accordance with our present invention, protactinium, uranium and thorium may be separated from an aqueous nitrate acid solution of neutron-irradiated thorium by contacting, under net nitrate ion deficient conditions, said solution with an organic solution of a trialkyl phosphate in an inert organic diluent, thereby preferentially extracting thorium and uranium into the resulting organic phase while confining protactinium and fission products to the resulting aqueous phase, scrubbing any small amounts of extracted protactinium and fission products from said organic phase with an aqueous solution of an inorganic nitrate salt, separating said protactinium- and fission products-containing aqueous phase from said uranium- and thorium-containing organic phase, and thereafter separating said extracted uranium and thorium from each other.

The practice of our invention achieves an excellent separation of protactinium, thorium and uranium in a single, relatively simple, continuous solvent extraction cycle. A single extractant, trialkyl phosphate, in proper volumetric proportion in an inert organic diluent, in combination with an aqueous scrub solution of an inorganic nitrate salt, sharply and efficiently extracts thorium and uranium from an aqueous nitric acid solution of neutron irradiated thorium, while confining protactinium and the preponderance of fission products to the aqueous phase, the net extraction and scrub conditions being nitrate ion deficient. The protactinium may be thereafter separated from fission products or may be permitted to decay to uranium-233, and the fission product solution readily concentrated to relatively small volume for convenient storage or recovery of individual radioisotopes. By first separating protactinium, which accounts for approximately 95% of the radioactivity of short-cooled thorium, from thorium and uranium-233 in a single solvent extraction step, the subsequent separation of these two elements in the resulting organic extract may be made under conditions of greatly reduced radiation.

We find that such subsequent processing, when combined in a single, continuous process with the protactinium separation, consistently obtains uranium-233 recoveries ranging up to approximately 99.7%. This valuable product affords the opportunity for vastly increasing the supply of fissionable material in abundance far beyond the potential extractable natural uranium-235, and provides a significant credit against the unit cost of generating electricity by nuclear fission means, thereby bringing closer the dream of economically competitive nuclear power.

The term "fission" is used herein in its generally accepted meaning as referring to the splitting of an actinide element, notably uranium and plutonium, into a plurality of parts upon the capture of a neutron of appropriate energy, and the term "fission products" refers to the immediate product nuclei from fission as well as to their radioactive decay products. (See Glasstone, *Principles of Nuclear Reactor Engineering*, especially pages 105–128). The closely similar statistical fission product yields of U-233, U-235 and Pu-239 are shown in Stevenson, *Introduction to Nuclear Engineering*.

Considering our invention now in its broader aspects, the present process comprises first dissolving the neutron-irradiated thorium metal, thorium oxide, thorium oxy-carbonate, or other thorium compounds. Perhaps the most common form of thorium utilization, at the present stage of the breeder program, is as an aluminum-clad thorium metal slug in heterogeneous reactors, the aluminum serving largely to contain charged fission fragments within the slug. Such aluminum-clad slugs may be dissolved, for example, by removing the aluminum jacket with a caustic-sodium nitrate solution, and then dissolving the thorium with an aqueous mineral acid, for instance aqueous nitric acid. In a preferred simultaneous dissolution of aluminum-clad slugs, the slug is dissolved with aqueous nitric acid containing tiny amounts of both fluoride and mercuric ions, the fluoride ion catalyzing thorium dissolution and the mercuric ion catalyzing the aluminum dissolution. Although the mechanism of neither catalytic action is clear, it is suggested, in the case of the mercuric ion, that the ion is reduced to the metal by aluminum metal, after which it amalgamates the aluminum surface and prevents formation of passive aluminum oxide films. While the presence of fluoride ion is essential for thorium dissolution, it poses a corrosion problem in subsequent processing. We find that this problem may be reduced by incorporating at least an equi-normal amount of aluminum in the dissolver solution to complex the fluoride. When aluminum-clad slugs are dissolved, extra aluminum may not have to be provided.

The aluminum nitrate, very conveniently, is beneficial in the obtainment of a nitrate ion deficient feed solution and also serves as a salting action for thorium and uranium in solvent extraction.

When aqueous nitric acid solutions of thorium are contacted with the organic trialkyl phosphate solution, more than 90% of the protactinium and certain fission product species such as ruthenium are unfortunately extractable, along with thorium and uranium-233. A cardinal feature of our process, then, is the critical discovery that such deleterious protactinium and ruthenium extraction may be substantially suppressed, without concomitant suppression of thorium and uranium extraction, by providing net nitrate ion deficient feed and scrub solutions. Thus, the feed or the scrub solution may be acid (not nitrate ion deficient), provided the net extraction and scrub conditions are nitrate ion deficient through the nitrate ion deficient solution overbalancing the acid solution; however, it is preferred that the feed and scrub solutions be each nitrate ion deficient.

As understood in this specification and in the appended claims, nitrate ion deficiency is a relative term to indicate that a solution of a nitrate salt of a metal of a given molarity will not register as high an acidity as a solution of the normal nitrate salt of the same metal molarity, or in other words, this is a measure of a stoichiometric deficiency of nitrate ion, which stoichiometric deficiency is made up by hydroxyl ion supplied through hydrolysis rather than by addition of other anions like sulfate; in this respect the solution is acid deficient in anions other than hydroxyl. Thus, a 0.1 normal nitrate ion-deficient solution of thorium, uranium and aluminum nitrate contains that much less nitrate ion than a solution of the same thorium, uranium and aluminum molarity. The solution will still register an acid pH, although less acid than a solution of the normal salt. In the case of aluminum nitrate, nitrate ion deficient solution may be thought of as a solution of a basic aluminum nitrate salt [e.g. $Al(OH)_2NO_3$], and such a salt is nitrate ion deficient compared to a solution of normal aluminum nitrate of the same aluminum molarity. Nitrate ion deficient thorium and aluminum nitrate solutions may be conveniently achieved by dissolving additional thorium or aluminum metal in aqueous solutions of the normal salt, by boiling off nitric acid as nitrogen oxides, or in the case of aluminum, by directly employing a basic salt. Generally, a net nitrate ion deficiency of approximately 0.1–0.6 normal is satisfactory, while approximately 0.3 normal is preferred. This may raise the question: Why can't nitrate ion deficiency be brought about by partial neutralization of an acidic solution by direct addition of a base, since, in effect this is the result? Two crucial considerations advise against, although not totally prohibiting, such procedure. Firstly, an undesirable increase of non-volatile bulk salt concentration would obtain (even with ammonium hydroxide). Secondly, there would be real risk of precipitation [particularly of $Al(OH_3)$] by formation of localized base concentration gradients. An analytical procedure for determination of nitrate ion deficiency will be described later.

When an aluminum-clad thorium metal slug is the thorium form employed for neutronic bombardment, additional process problems arise from troublesome metallurgical impurities commonly contained therein, such as beryllium, silicon, calcium, magnesium, niobium, iron, chromium, and nickel and compounds thereof. Especially undesirable is silicon, since siliceous materials are particular offenders as emulsion promoters in solvent extraction contactors and highly refractory claylike materials, which are distributed randomly throughout the process equipment, tend to become surface-active carriers of radioactivity. It is, therefore, highly desirable that the aqueous nitric acid feed solution be treated to minimize these effects.

We find that this may be accomplished by an evaporation-digestion step, the nitric acid condensate being recoverable for reuse in the next dissolution cycle. This treatment provides solution and temperature conditions which promote formation of stable silicas that are not deleterious in the following extraction cycle. Another distinct advantage of this treatment is the convenient obtainment of nitrate ion-deficient feed conditions. A further benefit is that it serves to deal with perhaps the most notoriously troublesome of all fission products, ruthenium. Ruthenium shows an uncanny ability to exist simultaneously in various valence states, as well as in different forms of molecular association, such as complexes and polymers, the result of which is extreme difficulty in seeking to confine it to a single phase during extraction. Nitrate ion deficient conditions strongly suppress ruthenium extractability, and digestion also achieves less extractable ruthenium species.

After the digestion of the feed solution, it may then be contacted with the trialkyl phosphate-organic diluent solution. The trialkyl phosphate employed should be a liquid at the ambient atmospheric temperature and should preferably comprise approximately 3–6 carbon atoms among each of its alkyl radicals (that is, from tri-propyl to tri-hexyl phosphate). The most suitable extractant is tri-n-butyl phosphate (hereinafter referred to as "TBP"). The organic diluent should be an inert hydrocarbon and have a density distinctly different than that of water, in order to permit adequate countercurrent flow type of contacting without requiring excessive pump capacity. Petroleum cuts, especially kerosene fractions, are particularly suitable diluents.

Upon contacting of the nitrate ion-deficient aqueous feed solution with the organic extractant, the thorium and uranium-233 preferentially pass into the organic phase, confining substantially all the protactinium and fission product values to the aqueous phase. The mechanism promoting preferential extraction of thorium and uranium into the organic phase, while confining protactinium and fission products to the aqueous phase, is not completely understood and we do not wish to be bound to any particular theory. It is suggested, however, that organic-soluble TBP complexes of thorium, uranium, and to lesser extent, nitric acid, are formed, as represented by $Th(NO_3)_4 \cdot 4TBP$, $UO_2(NO_3)_2 \cdot 2TBP$ and $HNO_3 \cdot TBP$. The confinement of the protactinium and fission products to the aqueous phase is explained by their failure to complex with TBP under the nitrate ion deficient conditions of the aqueous phase, various hydrolysis effects occurring instead, producing unextractable ionic species of protactinium and fission products.

To further enhance the sharpness of the separation, we find that an aqueous scrub solution containing nitrate ion serves to drive any small amounts of extracted protactinium and fission products from the organic phase. While a number of inorganic nitrate salts such as sodium nitrate, may be used to provide nitrate ion, we prefer to use nitrate ion deficient, aqueous aluminum nitrate solution. We further find that the provision of a small amount of phosphate ion in the scrub solution is unexpectedly effective in decontaminating the organic phase of protactinium. Under the described operating conditions decontamination factors from protactinium of $10^2$ are obtained without the inclusion of phosphate ion; with phosphate ion, decontamination factors of $10^4$ are obtainable. If the feed solution is of simultaneously dissolved aluminum-jacketed thorium slugs, the inclusion of a small amount of ferrous ion beneficially prevents extraction of any oxidized chromium impurities into the organic phase.

The aqueous stream from the extraction cycle contains virtually all the protactinium and fission products. The protactinium may then be separated from the fission products, if its individual recovery is desired, or it may be permitted to decay to uranium-233 which is then separated from the fission products by solvent extraction, as in the above extraction step. One method for the separation of the protactinium from fission products in the aqueous waste stream, in the absence of interfering ions, is by selective sorption on common inorganic adsorbents such as silica gel, followed by elution therefrom. Another method is by solvent extraction means with organic solutions of a trialkyl phosphate or a diisoalkyl carbinol in an inert hydrocarbon diluent. The preferred method for protactinium recovery comprises precipitating aluminum from the aqueous stream as an aluminum chromate precipitate, which precipitate selectively carries protactinium.

The organic extract from the extraction column, which contains thorium and uranium-233, substantially decontaminated of fission products and protactinium, is contacted with an aqueous stream of dilute nitric acid under carefully controlled flow and acid conditions to preferentially strip the thorium from the organic solution, while confining uranium to the organic solution. In conjunction with this, it is found beneficial to scrub any small amounts of uranium-233 from the stream with fresh organic solution of the character employed in the extraction cycle. The aqueous stream, containing the bulk product of the overall process, thorium, is substantially decontaminated and is sent to an evaporator for concentration. Careful control of conditions in the thorium separation column is necessary since the distribution coefficients of both uranium and thorium favor the organic phase.

The organic stream, containing the uranium-233, is then contacted with slightly acidified water to strip the uranium product. The resulting aqueous uranium solution may then be passed through a cation exchange column for further purification from trace amounts of corrosion products and any thorium or fission products. The uranium-depleted organic stream is introduced into a solvent recovery column where the decomposition products of the TBP are removed by washing with an aqueous sodium carbonate solution, after which the recovered solvent is recycled in the process.

Figure 1:
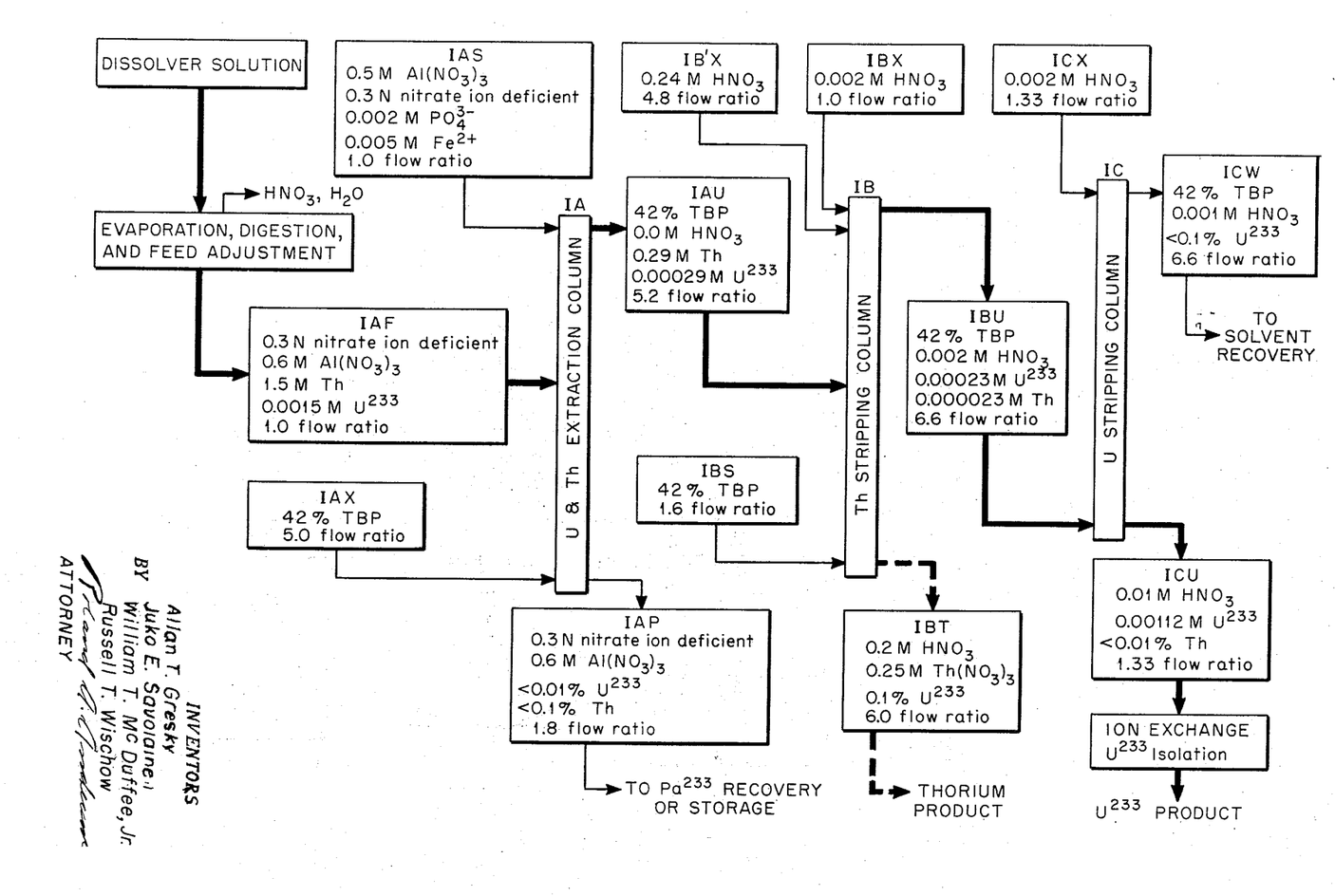

Having completed a general description of our process, a detailed description will now be undertaken, in conjunction with the single accompanying drawing which represents a preferred schematic flowsheet of our process. The main process flow is indicated by the heavy lines. Returning now to the dissolution of neutron-irradiated aluminum-jacketed thorium slugs, such slugs, which commonly contain 3 moles of thorium per mole of aluminum, may be charged into a metal dissolver tank, preferably of stainless steel, as is all process equipment. There it may be dissolved at a temperature of approximately 110°–130° C. with a stoichiometric excess of an aqueous solution of concentrated nitric acid containing small amounts of mercuric ion (aluminum reaction catalyst) and fluoride ion (thorium reaction catalyst). The exact stoichiometric excess employed depends upon the irradiation history of the thorium; short term material (two weeks of irradiation) dissolves in a 50% excess, while long term material dissolves incompletely in a 75% excess and requires a 100% stoichiometric excess. Although the quantitative composition of the dissolver solution is subject to considerable variation within the scope of our invention, particularly since the resulting solution is subjected to a feed adjustment step, an aqueous solution of approximate composition 13 N $HNO_3$, 0.04 M $F^-$ and 0.003 M $Hg^{2+}$ is preferred. The quantity of nitric acid used is calculated on the basis of 10.0 moles per mole thorium and 7.5 moles per mole aluminum charged to the dissolver. During the dissolution, which takes several hours (up to four hours of reflux are required for the dissolution of difficultly-soluble "blue" thorium oxide impurities in thorium metal), the off-gases, consisting mainly of $N_2$ and NO, with lesser amounts of $NO_2$, $N_2O$ and $H_2$, are contacted with water in a condenser to produce additional nitric acid, which may then be recycled to the dissolver. The total off-gas volume is about 50 liters per kilogram of thorium. As only about 50% of the nitric acid is consumed by reaction, the final dissolver solution has the approximate primary composition 1.0 M $Th(NO_3)_4$, 0.4 M $Al(NO_3)_3$ and 6.5 M $HNO_3$. Upon completion of the dissolution, the dissolver solution may be slightly cooled, say to 90°–100° C., and then transferred to a feed adjustment tank for evaporation and digestion. During distillation, the excess nitric acid and a portion of free acid, formed by hydrolysis of thorium and aluminum nitrates, are evaporated, and the condensate collected for further dissolving cycles. It is postulated that during distillation, the major components of the system apparently undergo stepwise dehydration; first the nitric acid is dehydrated and distilled; and this is followed by dehydration and partial denitration of aluminium nitrate. It appears that no dehydration of denitration of thorium occurs under these conditions (the aluminum nitrate apparently decomposes at 130°–140° C., while thorium nitrate does not until 157°–160° C.). If this hypothesis is correct, nitrate ion deficiency of the feed solution is due to the aluminum rather than the thorium contribution.

The distillation residue reaches a maximum acidity (6.75 M $HNO_3$) at a thorium concentration of about 1.33 molar and then decreases linearly with increasing thorium concentration, as shown by Table I, below. This maximum is thought to be a region with no "free water," only water of hydration remaining.

TABLE I. COMPOSITION OF RESIDUE AND DISTILLATE FRACTIONS DURING EVAPORATION CYCLE*

| Distillate acidity (M) | Calculated residue concentration | | Liquid temperature (° C.) |
|---|---|---|---|
| | Th (M) | $HNO_3$ (N) | |
| | 1.01 | 6.07 | 115 |
| 1.66 | 1.05 | 6.30 | 116 |
| 3.4 | 1.11 | 6.47 | 117 |
| 4.2 | 1.18 | 6.60 | 118 |
| 5.0 | 1.25 | 6.70 | 119 |
| 6.0 | 1.33 | 6.75 | 120 |
| 7.0 | 1.43 | 6.72 | 120 |
| 8.2 | 1.54 | 6.60 | 121 |
| 9.2 | 1.67 | 6.40 | 122 |
| 10.35 | 1.82 | 6.02 | 123 |
| 11.1 | 2.00 | 5.52 | 124 |
| 11.9 | 2.22 | 4.82 | 126 |
| 21.25 | 2.50 | 3.88 | 129 |
| 12.3 | 2.86 | 2.68 | 134 |
| 11.2 | 3.33 | 1.25 | 142 |
| 9.9 | 3.64 | 0.47 | 14 |
| 9.6 | 4.00 | **−0.45 | 15 |
| 10.3 | 4.45 | −1.65 | 167 |
| 11.6 | 5.00 | −3.30 | 177 |
| 14.0 | 5.72 | −5.75 | 185 |
| 15.5 | 6.66 | −9.30 | 190 |

*100% nitric acid excess 10 ml.-distillate cuts.
**Minus values refer to nitrate ion deficiency.

The evaporation should be continued until the feed solution reaches the approximate concentration 4–4.2 molar thorium, 1.6–1.8 molar aluminum and 0.2–0.4 normal nitrate ion deficient. This concentration can be reached without deleterious crystallization of thorium nitrate or oxide or of alumina. The residual solution is then diluted with water to yield, in addition to various metallurgical, corrosion, and fission product impurities, a feed solution of approximate composition 0.4–0.6 molar aluminum nitrate, 0.1–0.2 normal nitrate ion deficiency, 1.0–2.0 molar thorium nitrate, 0.02–0.1 molar fluoride ion and 0.002–0.02 molar mercuric ion and small concentrations of protactinium and uranium-233, depending upon the age and irradiation history of the slug. Characteristic uranium concentrations are about 0.0013 molar, or about 3 gms./liter, and characteristic protactinium concentrations are about 0.00006 molar. More acid feed solution can be tolerated if compensatory increase in nitrate ion deficiency of the scrub solution are made. A typical feed solution of 80 day-cooled thorium may have a practical beta-activity spectrum in counts per minute per milliliter at 10% geometry: $3 \times 10^{10}$ protactinium-233; $4 \times 10^8$ total rare earths; $2 \times 10^7$ zirconium; $2 \times 10^7$ niobium; and $5 \times 10^6$ ruthenium. These activities constitute the primary decontamination problems of the process.

The benefits of the evaporation-digestion cycle are numerous. Silicious impurities, dangerous emulsion promoters and radioactivity adsorbents, are rendered dehydrated and non-surface active. The digested silicious materials do not affect extraction efficiency, and need not be removed from the feed solution, affording further operational simplicity. Any remaining undissolved thorium oxide constituents are dissolved. Finally, the resulting nitrate ion deficient solution permits variation in the operating conditions of the extraction column (when column contacting means are employed) without disruption of steady state operation. Perhaps the greatest benefit of the nitrate ion deficient feed solution, in addition to suppression of protactinium extractability, is the great reduction in organic extractability of ruthenium. Ruthenium distribution coefficients (organic/aqueous) in the extraction step decrease from approximately $10^{-2}$ to $10^{-4}$ in in passing from acidic to nitrate ion deficient feeds, as shown in Table II, below. This table also indicates that if the feed adjustment is conducted in glass ware, rather than in the preferred stainless steel, a small amount of ferrous ion is beneficial.

mately 30%–60% trialkyl phosphate, by volume, and the remainder inert diluent. From the practical view point of providing sufficient extractant capacity for the bulk product, thorium, we prefer to employ a solution of approximate volumetric composition 42% (or 1.5 M) TBP and 58% diluent, which solution has a specific gravity of less than 0.9 gm./cm.$^3$. It is understood, however, that the composition of the extractant may be varied, provided compensatory adjustments of thorium concentration in the feed solution and/or relative flow rates or contact volumes of feed to extractant are made, without seriously affecting process operability.

As might be expected in the contacting of organic solutions of such complex character as petroleum cuts with aqueous acids, certain degradation products are inevitably formed. Particular offenders seem to be olefinic and aromatic contributions to the kerosene fraction and traces of acids, alkali and suspended materials. Traces of aromatics contribute to the formation of a second organic phase by extraction of a polymerized TBP complex of thorium. These undesirable constituents can be removed from the diluent by a pretreatment to yield a substantially saturated paraffinic diluent. In one pretreatment method, the diluent is washed with a $\frac{1}{100}$ volume of chromyl chlo- TABLE II.—RUTHENIUM DECONTAMINATION FACTORS AND DISTRIBUTION COEFFICIENTS OBTAINED IN EXTRACTION COLUMN AS A RESULT OF FEED ADJUSTMENT-STEP

| Run | Decontamination factor | | Distribution coefficient (organic/aqueous) | | Nitric acid in feed (molar) | Remarks |
|---|---|---|---|---|---|---|
| | Gross | Ru | 8th scrub stage (top of extraction column) | 5th extraction stage | | |
| 1 | 127 | 8 | 0.86 | $2 \times 10^{-3}$ | 0.56 | Acid feed—no adjustment. |
| 2 | 96 | 8 | 1.03 | 0.016 | 0.60 | Do. |
| 3 | $2.8 \times 10^3$ | 238 | 0.74 | $3 \times 10^{-4}$ | −0.15* | Nitrate ion deficient feed, feed adjustment. |
| 4 | $2.2 \times 10^3$ | 244 | 0.58 | $2 \times 10^{-4}$ | −0.44 | Do. |
| 5 | $1.5 \times 10^3$ | 160 | 0.62 | $3 \times 10^{-4}$ | −0.46 | Do. |
| 6 | $1.33 \times 10^4$ | 740 | 0.74 | $5 \times 10^{-4}$ | −0.14 | Feed adjustment in presence of 0.01 M Fe$^{++}$. |
| 7 | $1.31 \times 10^4$ | 823 | 0.84 | $6 \times 10^{-4}$ | −0.20 | Do. |
| 8 | $1.77 \times 10^4$ | 875 | 0.79 | $4 \times 10^{-3}$ | −0.28 | Feed adjustment in presence of 0.005 M Fe$^{++}$. |
| 9 | $1.03 \times 10^4$ | 940 | 1.37 | $5 \times 10^{-4}$ | −0.06 | Feed adjustment in presence of 0.0025 M Fe$^{++}$. |
| 10 | $1.68 \times 10^4$ | 1010 | 1.04 | $3 \times 10^{-4}$ | −0.45 | Feed adjustment in presence of type 309 SN b stainless steel. |

*Negative values indicate nitrate ion deficiency.

The nitrate ion deficiency of our feed and scrub solutions may be determined, in one way, by titration with standardized alkali, after complexing polyvalent metal ions with oxalate. The reagents are a saturated potassium oxalate solution, 0.1N NaOH standardized against potassium acid phthalate, and 0.1N HCl standardized against the foregoing NaOH. An aliquot of sample is pipetted into a titration vessel and a small magnetic stirring bar placed into the vessel. If less than 5 ml. of a 0.1N NaOH solution will be required to neutralize the estimated acidity of the sample, pipet an NCl spike into the titration vessel. Next, pipet 10 ml. of the potassium oxalate to solution into the vessel, buffer a Beckman automatic titrator and set the pH dial to read 7.0 and titrate with the NaOH. The calculation to give the tota milliequivalents of nitrate ion deficiency in the sample is:

(ml. of base $\times N$ of base) − (ml. of spike $\times N$ of spike)

Following the adjustment step, the resulting feed solution is contacted with the organic trialkyl phosphate solution. As indicated previously, the most suitable diluents are petroleum hydrocarbon fractions, especially the saturated hydrocarbons (paraffins and naphthenes). Particularly suitable are kerosene fractions having a specific gravity of about 0.75 gm./cm.$^3$, a boiling range of 300°–400° F. and a flash point of about 120° F. Such diluents are sold under the trade names "Varsol," "Esso 107," "Shell HFMS," "Gulf BT," "Atlantic Ultrasene" and "Shell Sol 72." The "Amsco" class of diluents find highest favor, "Amsco 125–82" being preferred. A satisfactory composition range of the organic extractant is approxiride, filtered, washed with caustic and then with water. Although this method gives a highly stable hydrocarbon diluent, it is not suitable for large scale use due to the corrosive nature and the expensiveness of chromyl chloride. In a more highly regarded pretreatment, the diluent is mixed with $\frac{1}{5}$–$\frac{1}{10}$ volume of fuming sulfuric acid, agitated for one hour, the phases separated, the diluent washed with water, neutralized with 0.1–1.0 molar sodium carbonate and then given a final water wash. This treatment may be used in conjunction with a silica gel contacting, for silica gel displays a tendency to adsorb olefins and aromatics.

The tributyl phosphate extractant also has certain hydrolysis products, di- and monobutyl phosphate, which tend to strongly complex thorium. The thorium-monobutyl phosphate complex is apparently not extracted from the aqueous phase and remains as an emulsifying, colloidal precipitate, whereas the thorium-dibutyl phosphate complex also appears as a colloidal precipitate but tends to follow the organic phase. These TBP-hydrolysis products may be removed, in one satisfactory method, prior to process use, by washing with a $\frac{1}{5}$ volume of 1.0 molar sodium hydroxide solution followed by three $\frac{1}{5}$ volumes of 0.1 molar sodium carbonate or sodium hydroxide. These pretreatments, in addition to removing potential emulsifying degradation products and preventing thorium loss, render the diluent more stable to destructive nuclear radiations, and increase thorium and uranium decontamination from fission products in the extraction cycle. For example, the iodine decontamination factor goes from 2–8 with untreated extractant to about 200 with pretreated extractant.

To effect the extraction, the organic extractant is intimately, and preferably countercurrently, contacted with the aqueous feed solution. Virtually any conventional solvent-extraction contacting means, such as separatory funnels, mixer-settlers, packed columns or the like may be employed. Remarkably efficient for large scale operation are pulse columns (i.e., a vertical column spanned by a plurality of horizontal perforated stainless steel plates; the column contents are periodically, sequentially surged upwardly and downwardly, being thereby turbulently admixed upon jetting through the plate perforations and being provided with fresh contacting surfaces for extraction beyond that expected from simple countercurrent operation). It should be apparent that varying flow rates may be employed in column operation while yet achieving efficient separation, provided compensatory adjustments in column length, contacting time, and feed, TBP and scrub solution concentrations are made. It is generally preferred however, that for extraction, the flow rate of the organic extractant should exceed that of the aqueous feed by several times. Generally, deviations of approximately ±20% in flow rates may be very satisfactorily practiced under the preferred process conditions stated below, but for optimum product recovery and decontamination, the exact values should be employed. The relative flow rates of the various process streams will, for convenience, be based on a value of 1.0 for the feed stream, where units may be in milliliters per minute, liters per hour, gallons per day or relative contact volumes (in batch countercurrent systems). The term "volume flow ratio" is used as a convenient expression of flow relations throughout the process system. Considering that the organic extractant is of specific gravity less than 1, as it is with the preferred 42% TBP-58% diluent system, such that the organic streams tend to rise in columns while the aqueous streams descend, the preferred column operation outlined in the flowsheet may be readily appreciated. The aqueous feed solution (IAF stream on the flowsheet) is introduced near the middle of IA column at a volume flow ratio of approximately 1.0, while the extractant, 42% TBP-58% Amsco (IAX stream) is introduced at the bottom of the column at a flow ratio of approximately 5.0 and flows upwardly through the column, thereby effecting extraction of thorium and uranium-233 in the lower part of the column. An aqueous scrub solution (IAS) of approximate composition 0.55 molar aluminum nitrate, 0.3 normal nitrate ion deficient, 0.01 molar ferrous sulfate and 0.003 molar phosphoric acid enters at the top of the column at a volume flow ratio of approximately 1.0. The aqueous scrub flows downwardly in intimate contact with the upflowing organic extract, thereby scrubbing the extract, and upon reaching the feed point, mixes with the aqueous feed flowing downwardly through the upflowing stream of organic extractant. About a half dozen countercurrent scrub stages are all that are required. Naturally, if an extractant of greater specific gravity than the feed solution were employed, the points of introduction in the column would be inverted. The thorium and uranium-233 containing organic extract (IAU) which is substantially decontaminated of protactinium and fission products, is continuously withdrawn from the top of the column at a volume flow ratio of approximately 5.0 and the aqueous product stream (IAP) of approximate concentration 0.5 molar aluminum nitrate and 0.3 normal nitrate ion deficient, and containing virtually all the protactinium and over 95% of the fission products, is continuously withdrawn from the bottom of the column at a volume flow ratio of approximately 1.8.

Under these preferred volume flow ratios, the TBP capacity of the organic stream provides 5.0 moles of the TBP per mole of thorium nitrate, and it may be considered that the organic stream becomes about 80% saturated with thorium; however, near the feed plate this value may reach 95% to 100%, owing to a degree of reflux in the scrubbing section. This characteristic is very important for decontamination from the rare earth fission products, which would be extracted in the presence of a large excess of TBP and which are normally found to undergo extensive reflux in the lower section of the extraction column.

The IAP stream may be subjected to a wide variety of treatments, depending upon the product desired. For protactinium recovery, a number of alternative recovery schemes are available. One involves the direct extraction of protactinium from an acidified IAP stream. Although protactinium is not extractable from nitrate ion deficient aqueous solution, it may be selectively extracted from aqueous acidic solutions by an organic solution of a trialkyl phosphate or diisoalkyl carbinol, such as diisopropyl or diisobutyl carbinol, in an inert diluent of the character previously described. The protactinium may then be stripped from the organic extract with slightly acidic water or preferably, with an aqueous alkali fluoride solution, for instance a sodium fluoride solution. Another scheme involves the adsorption of protactinium by various solid inorganic adsorbents like silica gel. Protactinium appears to adsorb quantitatively on the adsorbent in the absence of interfering ions such as iron, niobium, zirconium and chromium, and resolution of the adsorbed protactinium from any adsorbed fission products by selective elutriants affords a means of obtaining high concentrations of the constituent. Satisfactory elutriants are aqueous acidic solutions; aqueous carboxylic acid solutions are particularly efficient, aqueous oxalic acid being preferred.

The preferred chromate precipitation method for protactinium recovery comprises adjusting the IAP stream to approximately 0.03–0.1 molar sodium chromate. This is concentrated by evaporation to approximately 2.5 molar aluminum nitrate, 0.5–1.3 normal nitrate ion deficient and 0.1–0.5 molar chromate. An aluminum chromate precipitate, tentatively identified as $$Al_2(CrO_4)(NO_3)_4 \cdot 12H_2O,$$

then forms, carrying the protactinium. Interestingly, this precipitate will form only in nitrate ion deficient solutions, and not in neutral or acid solutions. The amount of protactinium carried by the precipitate appears to vary with the length of time the precipitate is allowed to remain in contact with the fission-product containing supernatant solution; one hour yields an 80% protactinium adsorption, while extending the time to 4–6 hours gives 85%–95% adsorption. A protactinium concentration factor of about 50 is attained, owing to the relatively small volume of the carrier precipitate. The precipitate is separated from the supernatant solution by centrifugation or other suitable means, and the supernatant is disposed of as a permanent waste, or as a source of radioisotopes. The chromate precipitate can be stored as a source of isotopically pure uranium-233, or, for protactinium recovery, readily dissolved in dilute nitric acid, extracted therefrom with an organic extractant of the type previously described, and stripped from the extract with dilute nitric acid or aqueous sodium fluoride.

If uranium-233 rather than protactinium recovery is of primary concern, which of course is normally the case, the aqueous stream may be stored to permit protactinium decay (about 10 half-lives are considered, for practical purposes, to constitute complete decay) after which the uranium can be readily recovered by solvent extraction. A number of distinct advantages flow from this approach. Higher uranium and thorium losses could be tolerated in the extraction step (generally higher fission product decontamination factors are obtainable at a slight cost of product recovery), since this procedure, in effect, amounts to a second extraction cycle; less shielding would be required; all the uranium would be recovered; and very short-cooled material could be processed without fear of loss as protactinium. Minor disadvantages would be the provision of storage facilities and a final product not as isotopically pure as uranium derived from separated protactinium (slight amounts of uranium-232 and uranium-234 would be present).

The IAU stream contains the organic extract of thorium and uranium. As indicated previously, both thorium and uranium form TBP complexes and show a tendency to remain in the organic extract phase upon contact with an aqueous nitric acid solution. Therefore, the partition of thorium from uranium depends upon the selection of conditions favoring the passage of thorium into the aqueous stream, while yet maintaining uranium solubility in the organic solution. This separation is made even more difficult by the great disparity in thorium and uranium concentrations; thorium:uranium ratios in the IAU stream are commonly in the order of 1000:1. We find that this delicate separation may be accomplished by the sensitive adjustment of flow rates and acidity of the strip solution. These parameters do not permit wide variation. The strip solution should be approximately 0.1–0.5 molar nitric acid, 0.2 molar nitric acid being preferred. Although higher concentrations of nitric acid provide salt strength for the distribution of thorium to the aqueous phase, the subsequent purification of uranium by ion exchange is made more difficult; uranium does not adsorb onto the resin in as concentrated a band from acidic solutions. The scrub solution, which reextracts any uranium swept into the aqueous stream, should be of the same character as the organic extractant employed, a solution of approximately 42% TBP–58% Amsco being preferred. As with the strip solutions, high TBP concentrations in the scrub, or faster flow rates, tend to be more efficient in reextracting uranium, but this may be at the expense of thorium recovery. Generally the flow rates of the organic feed and aqueous strip solutions should be about equal, while the flow rate of the organic scrub should be considerably less, say approximately 10–30% of the other streams.

With this in mind, the IAU stream is cascaded at a volume flow ratio of approximately 5.2 to the middle of the thorium partition column (IB column). Thorium is stripped with an aqueous solution of 0.2 molar nitric which flows down the column as a flow volume ratio of approximately 5.8, and this aqueous solution is scrubbed by an organic stream (IBS stream) introduced at the bottom of the column at a volume flow ratio of approximately 1.6. The aqueous strip stream is preferably a split stream, representing the combined flow of a 0.24 molar nitric acid solution (IB'X stream) introduced at a flow ratio of approximately 4.8 a small distance below the top of the column and a very slightly acidified water stream (IBX stream) introduced at a flow volume ratio of approximately 1.0 at the top of the column. The IBX stream serves to remove substantially all nitric acid from the ascending uranium-233 containing-stream before its introduction into the subsequent stripping column. Aqueous conditions are thus maintained at approximately 0.2 molar nitric acid throughout most of the column, which will permit thorium stripping into the aqueous stream and retention of the uranium in the organic stream. The water stream entering into the top of the column permits some uranium reflux, but it is necessary to remove nitric acid from the organic phase so that the subsequent uranium stripping and ion exchange cycle will operate at maximum efficiency. The IB column operation is extremely efficient in separating uranium and thorium; thus, while the IAU stream commonly contains thorium and uranium in a Th:U ratio of 1000:1, the IBU stream contains thorium and uranium in a Th:U ratio of only 1:50.

The aqueous thorium product stream (IBT stream) leaves the column at a flow volume ratio of approximately 6.0 and has the approximate composition 0.25 molar thorium nitrate and 0.2 molar nitric acid. It is fed to a continuous evaporator and concentrated to approximately 2.0 molar thorium nitrate and 1.2 molar nitric acid. The evaporation cycle is designed to permit the maximum distillation of any TBP that contaminates the product stream as well as concentrates the product. The condensates are discarded to chemical waste. A thorium decontamination factor of $10^4$ may be regularly achieved. Thorium decontamination from ruthenium may be improved by a factor of $10^2$ by precipitating thorium from the concentrated product solution as the oxalate.

The organic stream from the partition column (IBU stream), containing all the uranium-233 and having a nitric acid concentration of less than approximately 0.01 molar, is cascaded to the bottom of the uranium stripping column (IC column) at a flow volume ratio of approximately 6.6. The uranium may be readily stripped from the organic solution with water (demineralized water is preferred to prevent the introduction of contaminants into a product already being recovered in almost trace amounts). However, to prevent emulsification of the organic phase, the introduction of a slight amount of nitric acid is beneficial; this should be kept to a minimum so as not to reduce uranium saturation of the ion exchange resin. Thus, an aqueous stream of very dilute nitric acid, for instance approximately 0.002 molar, is introduced at the top of the column (ICX stream) at a flow volume ratio of about 1.33 which serves to strip the uranium-233 from the rising organic stream. The aqueous uranium product (ICU stream) is of approximate composition 0.001 molar uranyl nitrate and 0.01 molar nitric acid, and contains trace quantities of protactinium, niobium, and zirconium activities and trace quantities of corrosion products. The uranium may be recovered from the solution by a number of chromatographic separation procedures, especially those employing comminuted organic cation exchange resin beds.

A wide variety of cation exchangers may be satisfactorily utilized such as synthetic organic resins containing —COOH and —OH as the active exchange groups. However, extremely advantageous results may be obtained with relatively inert organic resins containing nuclear sulfonic acid groups, that is resins which contain numerous R—$SO_3$—R' groups in which R is an organic group such as a methylene group and in which R' is hydrogen or a metal cation, alkali metal cations, particularly sodium, being the preferred metal cation. Particularly satisfactory resins within this group are sulfonated phenol-formaldehyde resins, while sulfonated polystyrene resins are preferred due to their large exchange capacity, resistance to physical break-down under ionizing radiation and chemical stability to eluting reagents. Both these resin types contain a plurality of methylene sulfonic acid groups (—$CH_2SO_3H$), and in the adsorption process the hydrogen or sodium of the sulfonic acid group is replaced by a cation of the substance to be adsorbed, which thereupon forms a more or less loosely associated molecule with the resin. Among the specific nuclear sulfonated aromatic hydrocarbon polymers which may be satisfactorily employed in our invention are those described in U.S. Pat. 2,366,077 to G. F. D'Alelio and in U.S. Pat. 2,204,539 to H. Wassenegger and K. Jaeger. For reasons of ready availability, reference is made to the following excellent trade-named resins: Dowex-30, Rohm and Haas IR-100 and IR-120, Ionics, Inc. CR-51, and Dowex-50 (a cross-linked sulfonated poly-vinyl benzene polymer, which is the single preferred resin for use in our invention).

The following multi-step sequence appears to be especially efficient for the required nearly quantitative recovery of uranium from the ICU stream. This stream is first passed through a silica gel column for removal of any trace quantities of protactinium, niobium or zirconium activities, and then through a small Dowex-50 column. The column initially becomes saturated with uranium, but the uranium is gradually displaced by traces of the more strongly adsorbed thorium and corrosion products. The effluent from the small column is then passed onto a larger Dowex-50 column for further concentration and decontamination of the uranium-233. The uranium may be eluted with a wide variety of aqueous acidic elutriants.

Especially suitable are acetate and citrate solutions, while an aqueous solution of approximately 0.2 molar ammonium acetate and 0.4 molar acetic acid is preferred.

Finally, the organic stream from the stripping column (ICW stream) is cascaded to a solvent-recovery column, where it is washed with 0.2 molar sodium carbonate to remove TBP degradation products. As the solvent leaves this column it is centrifuged to assure removal of any decomposition products and then is pumped to storage for recycle in the process system.

The following examples are offered to illustrate our invention in greater detail.

EXAMPLE 1

The procedure outlined in the flow sheet was substantially followed, except that the evaporation-digestion cycle was omitted.

The contacting columns were pulse columns of glass, 0.5 inch internal diameter, with stainless steel fittings, plates, and spacers. Plate spacing in the columns was 1.0 inch, except in the IA column extraction section which was 0.5 inch. The organic stream was cascaded from IA column to IB column to IC column. All aqueous streams were fed by pumps and could be closely controlled. The flow of the primary solvent streams were controlled by throttling pressurized stream from a head tank. The IA column was equipped with an entrainment separator in the IAU line. There was about a 1 hour hold up in the IAU line between IA and IB columns, including that in the entrainment separator. There was about a 15 minute hold-up in the IBU transfer line.

An irradiated 6 inch aluminum-jacketed thorium slug (approximately 1,000 grams of U-233 per ton), cooled for about 180 days, was dissolved in 3.6 liters of 70% $HNO_3$, in a stainless steel dissolver, at 110°–115° C., using as catalysts 0.005 M $Hg^{2+}$, and 0.075 M $F^-$. The dissolver solution was adjusted to the IAF stream conditions indicated in Table V, below, by dilution with water and nitric acid. While still in the dissolver, the adjusted feed was cooled to room temperature, made 0.005 M in $HIO_4$, and allowed to digest for 15 minutes; it was then made 0.5 M in formic acid and the temperature raised to 108°–110° C. for three hours. After cooling, the feed was transferred, without filtering, to a stainless steel holding tank.

Table III, below, indicates the composition and flow rates of the entering streams and the various column heights.

TABLE III.—CONDITIONS OF THE RUN

| Steam | Composition | Flow rate | Flow rate |
|---|---|---|---|
| IAF | Th, 1.5 M; $HNO_3$, 0.5 N; Al, 0.8 M; U-233, 0.36 mg./ml.; Gross, 4.6 x 10⁹ c./m./ml; Pa, 3.71 x 10⁹ c./m./ml; Ru, 6.3 x 10⁶ c./m./ml; Nl, 1.15 x 10⁷ c./m./ml; Zr, 4.9 x 10⁷ c./m./ml; TRE, 2.58 x 10⁸ c./m./ml | 90 ml./hr. | 1.0 |
| IAS | Al, 0.6 M; $HNO_3$, 0.75 N nitrate ion deficient | 90 ml./hr. | 1.0 |
| IAX | TBP, 42.5%; Amsco 125-90W (preconditioned) 57% (diluent mixture also preconditioned by 1 hr. contact with 60 g. of Ca (OH)₂ per liter and filtering). | 90 ml./hr. | 5.0 |
| IBX' | $HNO_3$, 0.24 N | 90 ml./hr. | 4.8 |
| IBX | $HNO_3$, 0.01 N | 90 ml./hr. | 1.0 |
| IBS | TBP, 42.5%; Amsco 125-90W, 57.5% (preconditioned). | 90 ml./hr. | 1.6 |
| ICX | $HNO_3$, 0.01 N | 90 ml./hr. | 1.32 |

Column heights

IA-column____ 4 ft. of extraction; 6 ft. of scrub.
IB-column____ 2 ft. of scrub; 4 ft. of 0.24 N $HNO_3$ strip and 2.0 ft. of 0.01 N strip (split strip).
IC-column____ 5 ft. of strip.

The results of this run, which lasted approximately 35 hours, indicated that 98.2% thorium and 96% uranium recoveries were obtained, as well as excellent decontamination from fission products. The following tables are typical analysis of products and wastes streams at steady state operation. With regard to the IA column, no samples of the IAU and IAP streams were taken after radioactive feed was introduced into the columns, but samples taken during the non-radioactive start-up of the run were analyzed and values obtained were used to calculate process losses.

TABLE IV

Analyses of Product and Waste Streams From IA-column During Equilibrium Operation of Nonradioactive Start-up IAP — Th, 67.4 mg./ml.; U, 0.14 mg./ml.; $H^+$, 0.004 N nitrate ion deficient.

IAU — Th, 0.095 mg./ml.; U, 0.000037 mg./ml.*; $H^+$, 0.04 N nitrate ion deficient.

*This figure based on uranium concentration of 1.0 mg./ml. in feed in nonradioactive runs.

TABLE V.—ANALYSES OF PRODUCT AND WASTE STREAMS FROM IB- AND, IC-COLUMNS DURING RADIOACTIVE RUN

| Stream | Composition | Product decontamination factor |
|---|---|---|
| IBT (thorium product). | Th, 57 mg./ml. (98.2% recovery) 0.15 N. | |
| | $H^+$ | |
| | $U^{232}$, 1.2×10⁴ c./m./ml. (1.5% loss). | |
| | Gross, 9×10⁴ c./m./ml | 8.5×10³ |
| | Pa, 2×10⁴ c./m./ml | 3×10⁴ |
| | Ru, 1×10⁴ c./m./ml | 100 |
| | Nb, 2×10³ c./m./ml | 9.5×10² |
| | Zr, 2×10³ c./m./ml | 4.0×10³ |
| | TRE, 2×10³ c./m./ml | 2.2×10⁴ |
| ICU (uranium product). | $U^{233}$, 2.9×10⁴ (96% recovery) | |
| | $H^+$, 0.1 N | |
| | Th, 0.2 mg./ml. (U-Th sepn. factor) 10⁴. | |
| | Gross, 6.0×10³ c./m./ml | 5.9×10⁵ |
| | Ru, 4.0×10³ c./m./ml | 1.2×10² |
| | Nb, 700 c./m./ml | 1.3×10⁴ |
| | Zr, 50 c./m./ml | 7.7×10⁵ |
| | TRE, 20 c./m./ml | 1×10⁷ |
| ICW (waste organic). | Th, 0.01 mg./ml | |
| | $H^+$ | |
| | $U^{233}$, 1×10³ c./m./ml. (0.25% loss) | |
| | Gross, 9×10³ c./m./ml | |
| | Ru, 4×10⁴ c./m./ml | |
| | Nb, 200 c./m./ml | |
| | Zr, 300 c./m./ml | |
| | TRE, 20 c./m./ml | |

EXAMPLES 2–4

These examples report the results of runs, each of which lasted about 2–3 days. Except as indicated the exact flow-sheet procedure was followed.

The IA, IB and IC Columns were stainless steel pulse columns of 5 inch internal diameter. The IA column was a single vertical tower, while IB and IC columns were of the "concatenated" type, that is, made up of a series of linked vertical sections of lesser height than IA column, but operating as a single column than IA column, but operating as a single column of equivalent total length on a single generated pulse and especially adapted to provide extensive contact lengths with low vertical height. The IA column had a 9-ft.-long extraction section, to provide an equivalent of five contact stages, and a 22-ft.-long scrub section, to provide a minimum of eight stages, as required for a nominal throughput of 200 kg. of thorium per day. This was based on operation at 44% of flooding, a pulse amplitude of approximately 0.7 inch, and a pulse frequency of 40 cycles/min.

The organic scrub section of IB column was 15 ft. long to provide a minimum of five contact stages for efficient U-233 recovery. The strip section was 20 ft. long to provide eight stages for high thorium separation; the water scrub section was 10 ft. long for three stages to permit efficient removal of nitric acid from the organic effluent.

The IC column had a total length of 36 ft. to provide a minimum of five stages.

Irradiated aluminum-jacketed thorium slugs, cooled for 210 days, and containing about 1000 grams uranium per ton thorium were dissolved in an aqueous solution of approximate composition 13 N $HNO_3$, 0.04 N $F^-$, 0.003 M $Hg^{+2}$ and 0.04 M $Al^{+3}$. (In view of the long cooling period, the uranium contained only 0.1%–0.2% Pa, and so, after separation, no Pa recovery was attempted. With 90 day cooling, the Pa concentration would have been 5%–10%.) The final dissolver solution had an approximate composition of 1.0 M $Th(NO_3)_4$, 0.4 M $Al(NO_3)_3$ and 6.5 M $HNO_3$. The dissolver solution was transferred to a feed-adjustment tank, where the excess nitric acid and a portion of free acid were evaporated and the condensate collected for recycle. The residual nitrate ion deficient thorium and aluminum nitrate solution was digested for about 1 hour at 155° C. and the resulting solution adjusted to IAF stream conditions.

The radiochemical composition of the IAF streams, indicating the decontamination problems faced, are shown in Table VI, below.

TABLE VI.—RADIOCHEMICAL COMPOSITION OF IAF STREAMS

| | Activity (cts./min./ml.) | | |
|---|---|---|---|
| Constituent | Example 2 | Example 3 | Example 4 |
| Gross | 1.69×10⁸ | 1.67×10⁸ | 1.38×10⁸ |
| Ru | 4.24×10⁶ | 5.31×10⁶ | 6.0×10⁶ |
| Nb+Zr | 8.04×10⁷ | 1.0×10⁸ | 7.8×10⁷ |
| Pa | 2.61×10⁷ | 1.73×10⁷ | 1.24×10⁷ |
| Total rare earths | 1.01×10⁷ | 1.06×10⁸ | 7.13×10⁷ |
| Total | 2.5×10⁶ | 3.9×10⁶ | 5.0×10⁶ |

Table VII below, shows the excellent average overall decontamination factors achieved and the radioactivity in the products for the three examples.

TABLE VII.—DECONTAMINATION FACTORS AND ACTIVITY IN THORIUM AND URANIUM-233 PRODUCTS BASED ON 100 GM U/TON TH AT 210 DAYS COOLING

| | Overall decontamination factors, (Activity in IAF stream) (Activity in product) | | Activity in products (cts./min./ml.) | |
|---|---|---|---|---|
| Constituent | Uranium | Thorium | Uranium | Thorium |
| Gross | | | 5.52×10⁵ | |
| Do | 1.3×10⁵ | 1.08×10⁴ | 1.43×10⁵ | 2.31×10⁴ |
| Ru | 6.6×10⁴ | 3.6×10³ | 6.62×10⁴ | 1.08×10³ |
| Nb+Zr | 8.0×10⁶ | 1.9×10⁴ | 1.13×10⁴ | 1.02×10⁴ |
| TRE | 1.7×10⁷ | 4.1×10³ | 4.31×10³ | 1.75×10⁴ |
| Pa | 6.7×10⁶ | 2.57×10³ | 7.94×10³ | 1.28×10⁴ |
| U (gm./l.) | 175 | | | |
| Th (mg./l.) | | 463 | | |

Table VIII, below, shows the very small uranium and thorium losses to the IAP stream (protactinium-fission products) and the very small IB column uranium loss to the IBT stream (thorium product).

TABLE VIII.—URANIUM AND THORIUM LOSSES

| | IA column | | IB column |
|---|---|---|---|
| | Percent U lost | Percent Th lost | Percent U lost |
| Example: | | | |
| 2 | 0.039 | 0.19 | 1.0 |
| 3 | 0.016 | 0.14 | 0.4 |
| 4 | 0.019 | 0.09 | 0.4 |

The foregoing examples are merely illustrative and should not be construed as limiting our invention. In particular, it should be understood that changes may be made in process variables by those skilled in the art without departing from the spirit of our invention. Even if any such changes result in products of decreased decontamination, this may be remedied by additional solvent extraction cycles. In the same vein, additional solvent extraction cycles employing our herein disclosed conditions may be performed if it is desired either to avoid any of the unit operation treatments of the products, say the uranium ion exchange purification, or if products of still higher purity are desired, or if more highly radioactive, short cooled material is processed. Therefore, our invention should be limited only as is indicated by the appended claims.

Having thus described our invention, we claim:

1. A process for the separation of protactinium, uranium and thorium from an aqueous nitric acid solution of neutron-irradiated thorium containing said elements together with fission products, which comprises contacting, under net nitrate ion deficient conditions, said solution with an organic solution of a trialkyl phosphate in an inert organic diluent, thereby preferentially extracting uranium and thorium into the resulting organic phase while the confining protactinium and fission products to the resulting aqueous phase, scrubbing any small amounts of protactinium and fission products from said organic phase with an aqueous solution of an inorganic nitrate salt, separating the said protactinium-containing aqueous phase from said uranium and thorium-containing organic phase and thereafter separating said thorium and said uranium in the separated organic phase.

2. The process of claim 1, wherein said scrub solution is an aluminum nitrate solution provided with a small amount of phosphate ion.

3. The process of claim 1, wherein said trialkyl phosphate contains approximately 3–6 carbon atoms among each of its alkyl groups.

4. The process of claim 1, wherein said trialkyl phosphate is tri-n-butyl phosphate.

5. The process of claim 1, wherein said inert organic diluent is a saturated hydrocarbon diluent.

6. The process of claim 1, wherein the organic solution is of approximate volumetric composition 30%–60% tri-n-butyl phosphate and the remainder an inert, saturated hydrocarbon diluent.

7. A process for the separation of protactinium from an aqueous nitric acid solution of neutron-irradiated thorium containing said elements, fission products, and uranium, which comprises adjusting said solution to nitrate ion deficient conditions, countercurrently contacting the resulting feed solution with an organic solution of tri-n-butyl phosphate in an inert, saturated hydrocarbon diluent, at a volume flow ratio in which said organic solution flow is several times greater than said feed solution flow, thereby preferentially extracting uranium and thorium into the resulting organic phase while confining protactinium and fission products values to the resulting aqueous phase, scrubbing any small amounts of extracted protactinium and fission products from said organic phase with an aqueous solution of nitrate ion deficient aluminum nitrate provided with a small amount of phosphate ion at a volume flow ratio approximately equal to that of said feed solution, and separating said protactinium and fission products-containing aqueous phase from said uranium and thorium-containing organic phase.

8. The method of claim 7, in which the feed solution: organic solution: aqueous scrub solution volume flow ratio is approximately 1:5:1.

9. The process of claim 7, wherein said protactinium is recovered from said separated protractinium and fission products-containing aqueous phase by acidifying said solution and contacting the resulting solution with an organic solution of an extractant selected from the group consisting of trialkyl phosphate and diisoalkyl carbinol in aninert, saturated hydrocarbon diluent, separating the resulting protactinium-containing organic phase from the resulting fission products-containing aqueous phase, and stripping said protactinium from said organic phase with an aqueous solution.

10. The process of claim 7 wherein said proctinium is separated from said fission products in said separated aqueous phase by providing said solution with chromate ion, and separating the resulting protactinium-carrying aluminum chromate precipitate from the resulting fission products-containing supernatant solution.

11. A process for the separation of protactinium, uranium and thorium in an aqueous nitric acid solution of neutron-irradiated thorium containing said elements together with fission products, which comprises adjusting said solution to a concentration of approximately 0.5 molar aluminum nitrate, 1.5 molar thorium nitrate, 0.3 normal nitrate ion deficient; intimately, countercurrently contacting the adjusted solution with an organic solution of approximately volumetric composition 42% tri-n-butyl phosphate and 58% an inert, saturated hydrocarbon diluent, at a volume flow rate of organic: aqueous phases of approximately 5:1, thereby preferentially extracting thorium and uranium into the resulting organic phase while confining said protactinium and fission products to the resulting aqueous phase, scrubbing any small amounts of extracted protactinium and fission products from said organic phase with an aqueous solution of approximately 0.5 molar aluminum nitrate, 0.3 nitrate ion deficient and 0.003 molar phosphate ion at a volume flow ratio of approximately 1.0, separating said protactinium and fission products-containing aqueous phase from said uranium and thorium containing organic phase, adjusting the separate aqueous phase to a concentration of approximately 2.5 molar aluminum nitrate, 1.3 normal ntirate ion deficient, and 0.3 molar chromate ion, and separating the resulting protactinium-carrying aluminum chromate precipitate from the resulting fission-products containing supernatant solution; and thereafter separating said thorium from said uranium in separated organic phase.

12. A process for the separation of protactinium, thorium and uranium from an aqueous nitric acid solution of neutron-irradiated thorium containing said elements together with fission products, which comprises contacting, under net nitrate ion deficient conditions, said solution with an organic solution of a trialkyl phosphate in an inert organic diluent, thereby preferentially extracting said uranium and said thorium into the resulting organic phase while confining said protactinium and fission products to the resulting aqueous phase, scrubbing any small amounts of extracted protactinium and fission products from said organic phase with an aqueous scrub solution of aluminum nitrate, separating said uranium and thorium-containing organic phase from said protactinium and fission products containing aqueous phase, contacting the separated organic phase with a dilute aqueous nitric acid solution, thereby preferentially stripping said thorium into the resulting aqueous phase while confining said uranium to the resulting organic phase, scrubbing any extracted uranium from said aqueous phase with additional of said organic solution, separating said uranium-containing organic phase from said thorium-containing aqueous phase, stripping said uranium from the separated organic phase with a very dilute aqueous nitric acid solution, and separating the resulting uranium-containing aqueous phase from the resulting uranium-depleted organic phase.

13. The method of claim 12, wherein said aluminum nitrate scrub solution is provided with a small amount of phosphate ion.

14. The process of claim 12, wherein the thorium and uranium-containing organic phase is contacted with said dilute nitric acid stripping solution and said organic scrub solution at a volume flow ratio in which said organic and aqueous stripping solution flows are approximately equal and several times greater than that of said organic scrub solution, and the separated uranium-containing organic phase is contacted with said very dilute aqueous nitric acid stripping solution at a volume flow ratio in which said organic solution flow is several times greater than that of said stripping solution flow.

15. The method of claim 14, wherein the volume flow ratio of said thorium and uranium-containing organic: aqueous strip: organic scrub solutions is approximately 5:6:1 and the volume flow ratio of said uranium-containing organic solution: aqueous strip solution is approximately 6:1.

16. The process of claim 12, wherein said trialkyl phosphate is tri-n-butyl phosphate and said inert organic diluent is an inert, saturated hydrocarbon diluent.

17. The process of claim 12, wherein said protactinium is separated from said separated protactinium and fission product-containing aqueous phase by contacting said solution with chromate ion, and separating the resulting protactinium-carrying aluminum chromate precipitate from the resulting supernatant solution; and said uranium is recovered from said separated uranium-containing aqueous phase by contacting said solution with an organic cation exchange resin bed, and separately eluting and collecting the resulting adsorbed uranium from said resin bed with an aqueous acidic elutriant.

18. The process of claim 12, wherein said neutron-irradiated thorium is initially in the form of aluminum jacketed thorium metal and said thorium is dissolved in an aqueous nitric acid solution containing small amounts of mercuric and fluoride ions.

19. A process for the separation of protactinium, thorium and uranium from an aqueous acidic solution of neutron-irradiated thorium containing said elements together with fission products, which comprises adjusting said solution to approximately 0.1–0.6 normal nitrate ion deficiency, countercurrently contacting the resulting adjusted solution with an organic solution of approximate volumetric composition 30%–60% tri-n-butyl phosphate, and the remainder an inert, saturated hydrocarbon diluent, thereby preferentially extracting said thorium and said uranium into the resulting organic phase while confining said protactinium and fission products to the resulting aqueous phase, scrubbing any small amounts of extracted protactinium and fission products from said organic phase with an aqueous, approximately 0.1–0.6 normal nitrate ion deficient aluminum nitrate solution provided with a small amount of phosphate ion, separating said uranium and thorium-containing organic phase and said protactinium and fission product-containing aqueous phase, countercurrently contacting the separated organic phase with an approximately 0.1–0.4 molar aqueous nitric acid solution at a volume flow ratio of organic: aqueous phases of approximately 5:6, thereby preferentially stripping said thorium into the resulting aqueous phase while confining said uranium to the resulting organic phase, countercurrently scrubbing any extracted uranium from said aqueous phase with additional of said organic solution at a volume flow ratio of approximately 1.0, separating said uranium-containing organic phase from said thorium-containing aqueous phase, countercurrently contacting the separated organic phase with an approximately 0.002–0.01 molar aqueous nitric acid solution, thereby stripping said uranium into the resulting aqueous phase, separating said aqueous phase from the resulting uranium-depleted organic phase, contacting said separated uranium-containing aqueous phase with a comminuted organic cation exchange resin bed characterized by a plurality of nuclear sulfonic acid groups, and separately eluting and collecting the resulting adsorbed uranium from said resin bed with an aqueous acidic elutriant.

20. A process for the separation of protactinium, thorium, and uranium from an aqueous acidic solution of neutron-irradiated thorium containing said elements together with fission products, which comprises adjusting the concentration of said solution to approximate composition 1.5 molar thorium nitrate, 0.5 molar aluminum nitrate, 0.3 normal nitrate ion deficient, countercurrently contacting the adjusted solution with an organic solution of approximate volumetric composition 42% tri-n-butyl phosphate and 58% an inert saturated hydrocarbon diluent at a volume flow ratio of aqueous: organic phases of approximately 1:5, thereby preferentially extracting said thorium and uranium into the resulting organic phase while confining said protactinium and fission products to the resulting aqueous phase, scrubbing any extracted protactinium and fission products from said organic phase with an aqueous scrub solution comprising approximately 0.5 molar aluminum nitrate, 0.3 nitrate ion deficient and 0.003 molar phosphate ion at a volume flow ratio of approximately 1.0, separating said protactinium and fission products containing aqueous phase from said uranium and thorium-containing organic phase, contacting the separated organic phase with an approximately 0.2 molar nitric acid solution at a volume flow ratio of organic: aqueous phases of approximately 6:5, thereby preferentially stripping said thorium into the resulting aqueous phase while confining said uranium to the resulting organic phase, countercurrently scrubbing any extracted uranium from said aqueous phase with additional of said organic solution, separating said thorium-containing aqueous phase from said uranium-containing organic phase, countercurrently contacting the separated organic phase with an approximately 0.05 molar aqueous nitric acid solution at a volume flow ratio of organic: aqueous phases of approximately 6:3, thereby stripping said uranium into said aqueous phase and separating the resulting uranium-containing aqueous phase and the resulting uranium-depleted organic phase; concentrating said separated, thorium-containing aqueous phase by evaporation; contacting said separated, uranium-containing aqueous phase with a comminuted organic cation exchange resin bed characterized by a plurality of nuclear sulfonic acid groups, and selectively eluting and collecting the resulting adsorbed uranium from said bed with an aqueous acetate solution.

21. The process of claim 20 wherein said neutron-irradiated thorium is initially in the form of aluminum-jacketed thorium metal and is dissolved in an aqueous acidic solution of approximate composition 13 molar nitric acid, 0.04 molar fluoride ion and 0.003 molar mercuric ion.

References Cited

UNITED STATES PATENTS

| | | | |
|---|---|---|---|
| 2,897,046 | 7/1959 | Bohlmann | 423—10 |
| 2,894,806 | 7/1959 | Elson | 423—10 X |
| 2,789,878 | 4/1957 | Peppard | 23—14.5 |

OTHER REFERENCES

Gresky, "Proceedings of the International Conference on the Peaceful Uses of Atomic Energy," vol. 9, pp. 505–510, held in Geneva Aug. 8–20, 1955, United Nations, N.Y.

Kleinberg AEC Document AECD–3674, pp. 12–6, Sept. 10, 1954, declassified Sept. 20, 1955.

Thompson, AEC Document AECD–1897, pp. 1–4, February 1948, declassified Apr. 15, 1948.

Ward, AEC Document AECD–2524, p. 6, Aug. 7, 1947, declassified Mar. 11, 1949.

CARL D. QUARFORTH, Primary Examiner

R. L. TATE, Assistant Examiner

U.S. Cl. X.R.

423—7, 10, 19, 250, 252, 253; 252—301.1 R

UNITED STATES PATENT OFFICE
CERTIFICATE OF CORRECTION

Patent No. 3,825,649             Dated    July 23, 1974

Inventor(s)    A. T. Gresky et al.

It is certified that error appears in the above-identified patent and that said Letters Patent are hereby corrected as shown below:

Column 1, line 33, "323" should read --233--.

Column 8, line 43, "21.25" should --12.25--; line 46, "14" should read --149--; line 47, "15" should read --157--.

Column 9, line 59 "tota" should read --total--.
Column 10, line 11, "withut" should read --without--.
Column 15, line 50, "Steam" should read --Stream--; "rate" should read --Ratio--; line 63, "IBX'" should read --IB'X--.
Column 16, line 15, "IAP" should read --IAU--; line 19, "IAU" should read --IAP--.
Column 17, line 39, "100 GM" should read --1000 GM--.
Column 18, line 16, "the" should be deleted; line 72 "proctinium" should read --protactinium--.
Column 19, line 13, "rate" should read --ratio--; line 24 "separate" should read --separated--; line 26 "ntirate" should read --nitrate--

*Signed and Sealed this*

*fourteenth* Day of *October 1975*

[SEAL]

Attest:

RUTH C. MASON            C. MARSHALL DANN
*Attesting Officer*        *Commissioner of Patents and Trademarks*